United States Patent [19]
Manning

[11] Patent Number: 5,980,151
[45] Date of Patent: Nov. 9, 1999

[54] UPSTANDING ASSEMBLY

[76] Inventor: Keith Charles Manning, 95 East Street, Long Buckby, Northamptonshire, United Kingdom, NN6 7RA

[21] Appl. No.: 08/809,692

[22] PCT Filed: Sep. 22, 1995

[86] PCT No.: PCT/GB95/02254

§ 371 Date: May 15, 1997

§ 102(e) Date: May 15, 1997

[87] PCT Pub. No.: WO96/09783

PCT Pub. Date: Apr. 4, 1996

[30] Foreign Application Priority Data

Sep. 28, 1994 [GB] United Kingdom .................... 9419519
Jun. 22, 1995 [GB] United Kingdom .................... 9512706

[51] Int. Cl.$^6$ ................................................. A47B 77/06
[52] U.S. Cl. ..................... 403/403; 108/27; 312/140.1; 312/140.4
[58] Field of Search ................................... 403/403, 231; 312/140.1, 140.4; 108/27

[56] References Cited

U.S. PATENT DOCUMENTS 2,697,019  12/1954  Stefan ........................................ 108/27
2,940,805  6/1960  Nordmark .................................. 108/27
4,216,365  8/1980  Bryant ....................................... 108/21

FOREIGN PATENT DOCUMENTS 307552   3/1989  European Pat. Off. .
2402623  7/1975  Germany .
1153419  5/1969  United Kingdom .
2094140  9/1982  United Kingdom .

*Primary Examiner*—Chuck Y. Mah
*Assistant Examiner*—Alison K. Pickard
*Attorney, Agent, or Firm*—Wood, Phillips, VanSanten, Clark & Mortimer

[57] ABSTRACT

An upstand mounting assembly (10) for a worksurface (8) of a kitchen comprises an upstand member (14) and a mounting member (12). The mounting member (12) comprises a recess for receiving the base (48) of the upstand member (14), means (35,38) for retention of the upstand member (14) in the recess, and damming means (36) for prevention of ingress of unwanted substances into the recess, in use.

19 Claims, 2 Drawing Sheets

UPSTANDING ASSEMBLY

The present invention relates to an upstand assembly, particularly but not exclusively to an upstand assembly for a worksurface of a kitchen.

Many kitchens include a worksurface for the preparation of food. Due to hygiene requirements, a worksurface is often covered by a hard wipeable protective coating such as a laminated coating of melamine resin. This type of coating is often applied to a cheap material, for instance medium density fiber-board (MDF) or chipboard. However, the coating is usually applied only to the areas of the chipboard which form the visible areas of the worksurface, in use. This is to save cost and to enable fixing of support and attachment members to the uncovered areas of the worksurface, which are not visible to a user of the worksurface in use.

This arrangement may be used for surface for the preparation of food or other activities. However, some waste materials, particularly fluids, may be accidentally directed towards unprotected regions of the worksurface. In particular, if a worksurface is wiped down with a damp cloth, or spillages of water etc. occur, this water may seep through a gap between the worksurface and a wall against which, it is mounted. The part of a worksurface normally abutting a wall is generally uncoated, and so water may come into contact with the underlying material, i.e. chipboard or MDF. This material is liable to expand on contact with water, thus causing irreversible damage to the worksurface as the coating, liable to stretch, bubble and crack. This effect is known as blowing.

It is an object of the present invention to provide a system, which is both effective in preventing blowing and is aesthetically pleasing as well.

According to one aspect of the invention there is provided an upstand mounting assembly for a worksurface of a kitchen, said assembly comprising an upstand member and a mounting member, said mounting member comprising a recess for receiving the upstand member, means for retention of the upstand member in said recess, and damming means for prevention of ingress of unwanted substances into said recess, in use.

Preferably, the upstand member and the mounting member are substantially elongate. The mounting member may define two substantially planar mounting surfaces, the surfaces being at an angle to one another and being adapted for attachment respectively to a wall and a workshelf at the junction thereof, in use. Preferably, the mounting surfaces are defined by a lateral flange and an upright flange of the mounting member, the upright flange being substantially perpendicular to the lateral flange and extending from one edge thereof.

The retention means may retain the upstand member resiliently. In a preferred embodiment, the retention means includes a resilient longitudinal lip provided on each of the flanges, at or adjacent the distal edge thereof to retain the upstand member. The lip of the lateral flange may comprise the damming means. Preferably, the mounting member includes at least one projection extending into the recess for insertion into a corresponding opening defined in the upstand member.

Adhesive may be applied between the mounting member and the upstand member for retention of the mounting member in the recess.

The upstand member and the mounting member are preferably of substantially uniform cross-section.

The upstand member may be principally made of a compacted material. The compacted material may be MDF or may be chipboard or may be plywood. A protective coating is preferably provided on at least the exposed portion of the upstand member.

According to a further aspect of the invention there is provided an upstand mounting assembly according to the first aspect of the invention mounted on a worksurface. In this arrangement, the upstand member may be of the same depth as the thickness of the worksurface. When a protective coating is provided on the upstand member, the same protective coating may be provided on the worksurface. Preferably, the upstand member is made from the same material as the worksurface. The upstand member may be the same as the front edge of the worksurface, and, for example, may be out from a sheet of the same material as the worksurface.

Two embodiments of the invention will now be described by way of example with reference to the drawings in which.

Figure 1:
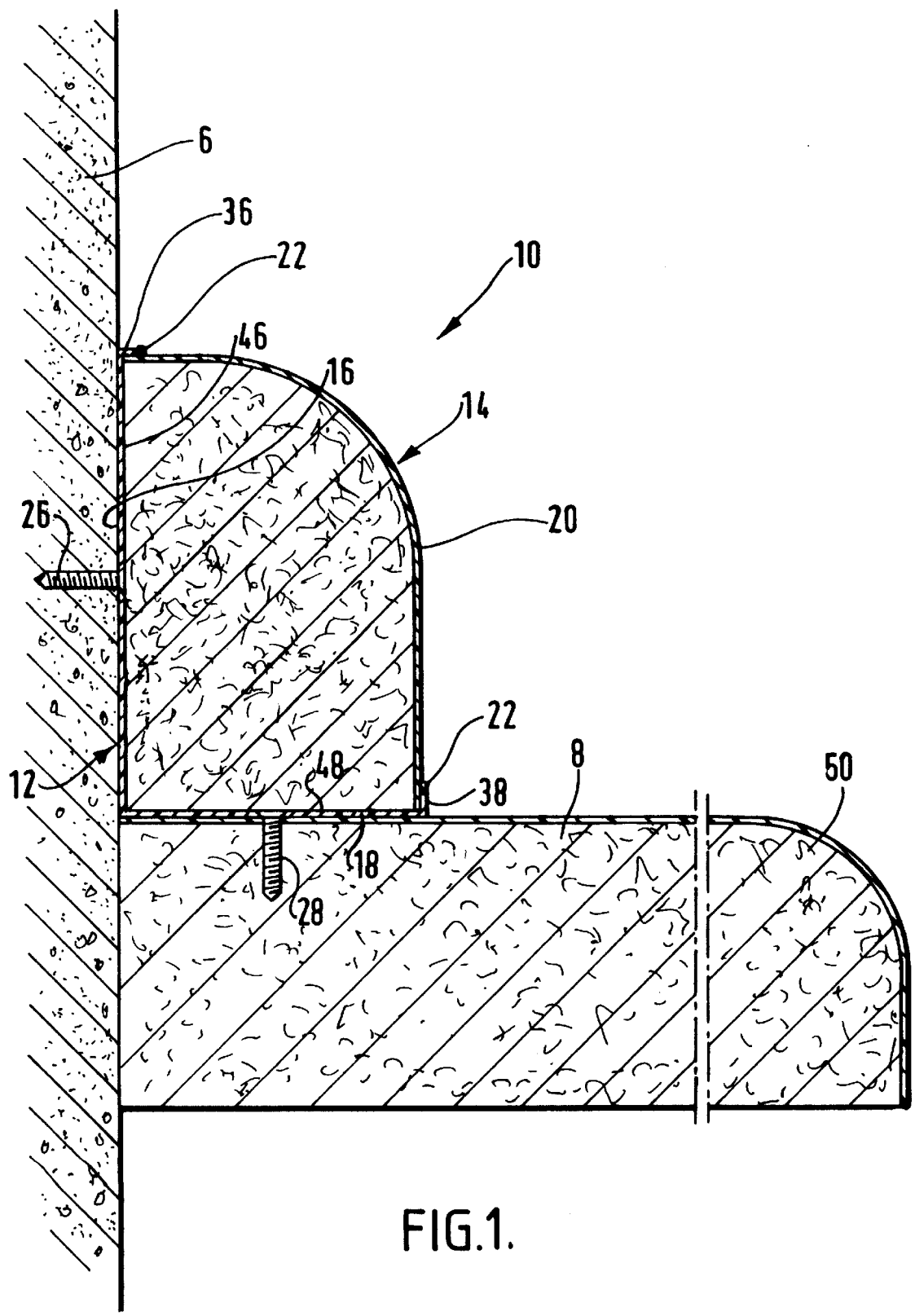
FIG. 1 is a cross-section of a first embodiment of the invention.

Referring to FIG. 1, an upstand assembly 10 comprises a mounting member 12 and an upstand member 14, each being elongate and of substantially uniform cross-section.

The mounting member 12 has an upright flange 16 and a transverse flange 18, said flanges being substantially mutually perpendicular with the transverse flange 18 extending from the lower edge of the upright flange 16. The mounting member 12 is arranged to be fixed to wall 6 and to a worksurface 8 extending substantially perpendicular thereto, the upright flange 16 being flush against the wall 6 and the transverse flange being flush against the worksurface 8, the respective flanges 16,18 being attached to the wall 6 and the worksurface 9 by screws 26,28 passing through apertures in the flanges 16,18. The screws are countersunk so that the screwheads lie flush with the inner surfaces of the flanges 16,18. Along the distal edge of each flange 16,18 is an upstanding lip 35,38. The whole mounting member 12 is an extrusion of a resilient plastics material.

The upstand member 14 is principally made of a filler material such as chipboard. The upstand member 14 is substantially rectangular in cross-section with one corner 45 being rounded off. The two substantially perpendicular faces 46,48 which do not meet at the rounded corner 45 are uncoated but the remainder of the surface of the material is covered by a laminated plastics coating 20. The upstand member 14 is of the same shape as the terminal edge 50 of the worksurface 8 to which it is to be affixed and has the same coating 20.

In use, the mounting member 12 is screwed to a worksurface 8 and a wall 6 using screws 26,23 through the aperture in the flanges 16,15. The upstand member 14 is when pressed into the recess defined between the flanges 16,18. The lips 36,38 are resilient to retain the upstand member 14 in place in the mounting member 12. The faces 46,48 adjoin the flanges 16,18 respectively. The lip 38 of the transverse flange 18 constitutes the aforesaid "damming means" and prevents ingress of fluid such as water from the worksurface 50 into the assembly 10 where it would degrade the water degradable chipboard upstand member 14 by causing blowing.

The boundary between the lips 36,38 and the laminated plastics coating 20 may in addition be sealed by means of a known sealant material 22.

Figure 2:
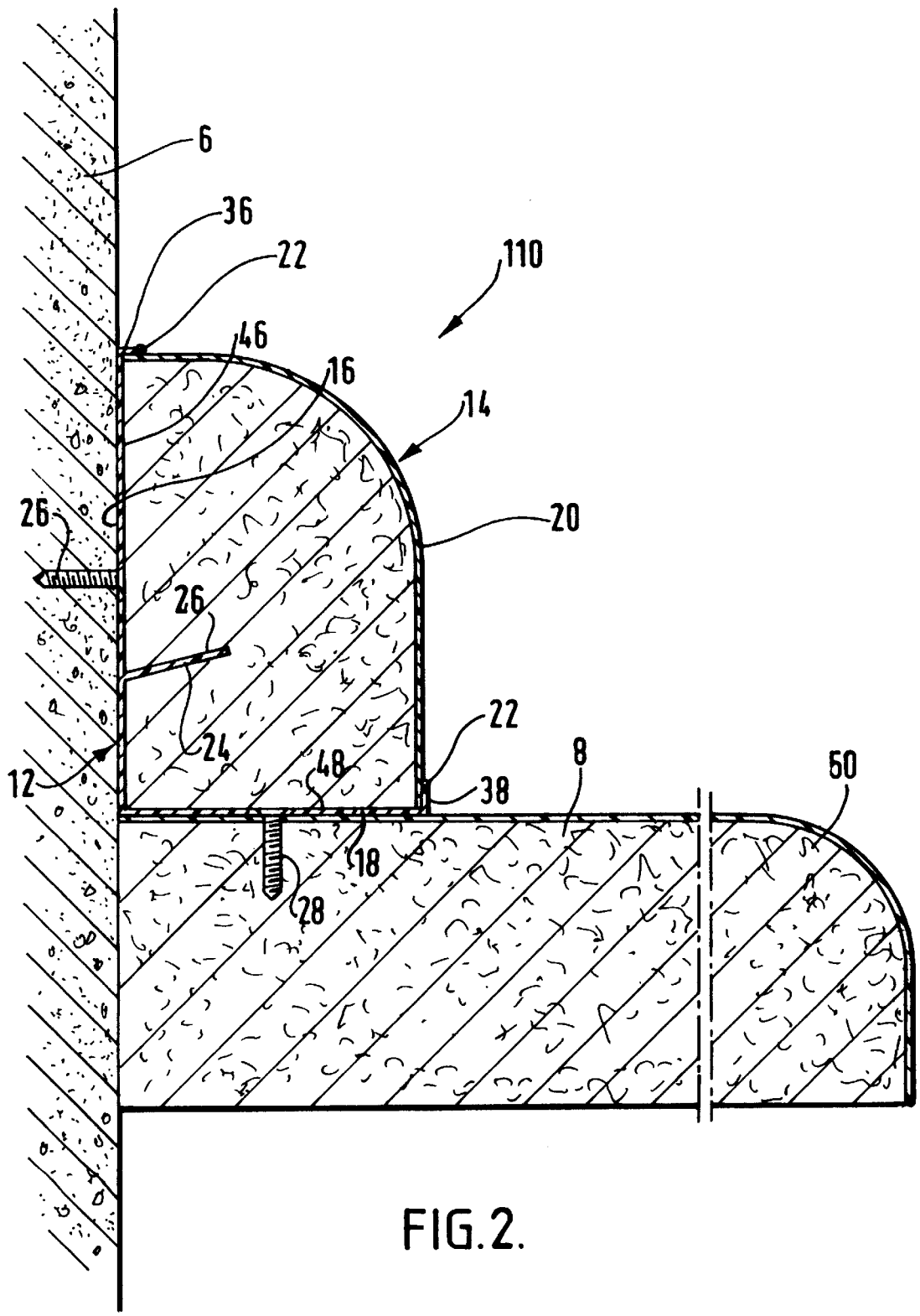
FIG. 2 is a cross-section of a second embodiment of the invention.

Turning now to FIG. 2, an upstand assembly 110 as described above is shown, but with the addition of a third flange 24 extending from the upright flange 16. This third flange 24 extend into the recess 26 defined between the flanges 16,18 of the upstand member 14. The third flange 24 is planar and at an angle to the plane of the flange 14, extending upwardly from the upright flange 15. In use the third flange 24 is received in a slot 28 defined in the upstand member 14 and assists retention at the upstand member in the mounting member 12. Adhesive may be coated on the third flange to further aid retention of the upstand member 14 in the mounting member 12.

The mounting member 12 may be made from any suitable material. Thus it may be made from plastics material but could also, for example be made from aluminum in which case the upstand member would slide, rather than snap, into place.

I claim:

1. An upstand mounting assembly for a worksurface of a kitchen, said assembly comprising an upstand member and a mounting member, said mounting member being of single piece construction and comprising a recess for receiving the base of the upstand member, means for retention of the upstand member in said recess, and damming means for prevention of ingress of unwanted substances into said recess, in use, wherein the upstand member is principally made of a compacted material selected from the group consisting of medium density fiberboard (MDF) and chipboard.

2. An assembly as claimed in claim 1, wherein the upstand member and the mounting member are substantially elongate.

3. An assembly as claimed in claim 1, wherein the retention means is arranged to retain the upstand member resiliently.

4. An assembly as claimed in claim 1, wherein the mounting member defines two substantially planar mounting surfaces, the surfaces being at an angle to one another and being arranged to lie against, respectively, a wall and a workshelf in the region of a junction of the wall and workshelf, in use.

5. An assembly as claimed in claim 4, wherein the mounting surfaces are defined by a lateral flange and an upright flange.

6. An assembly as claimed in claim 5, wherein the lateral flange and the upright flange are substantially perpendicular and the upright flange extends from one edge of the lateral flange.

7. An assembly as claimed in claim 5, wherein the retention means includes a resilient longitudinal lip provided on each of said flanges at or adjacent the distal edge thereof to retain the upstand member.

8. An assembly as claimed in claim 7, wherein the flanges are resilient.

9. An assembly as claimed in claim 5, wherein damming means comprises a lip on the lateral flange.

10. An assembly as claimed in claim 9, wherein the lip of the retention means is also the lip of the damming means.

11. An assembly as claimed in claim 1, wherein the mounting member includes at least one projection extending into the recess for insertion into a corresponding opening defined in the upstand member.

12. An assembly as claimed in claim 1, wherein adhesive is provided between the mounting member and the upstand member or retention of the mounting member in the recess.

13. An assembly as claimed in claim 1, wherein the upstand member and the mounting member are of substantially uniform cross-section.

14. An assembly as claimed in claim 1, wherein a protective coating is provided on at least the exposed portion of the upstand member.

15. A combination of worksurface and an assembly as claimed in claim 1, the assembly being mounted on the worksurface.

16. A combination as claimed in claim 15, wherein the upstand member is of the same depth as the thickness of the worksurface.

17. A combination as claimed in claim 15, wherein the same protective coating is provided on the worksurface as is provided on the upstand member.

18. A combination as claimed in claim 15, wherein the upstand member is made from the same material as the worksurface.

19. A combination as claimed in claim 18, wherein the upstand member is the same as the front edge of the worksurface.

* * * * *